Figure 1:
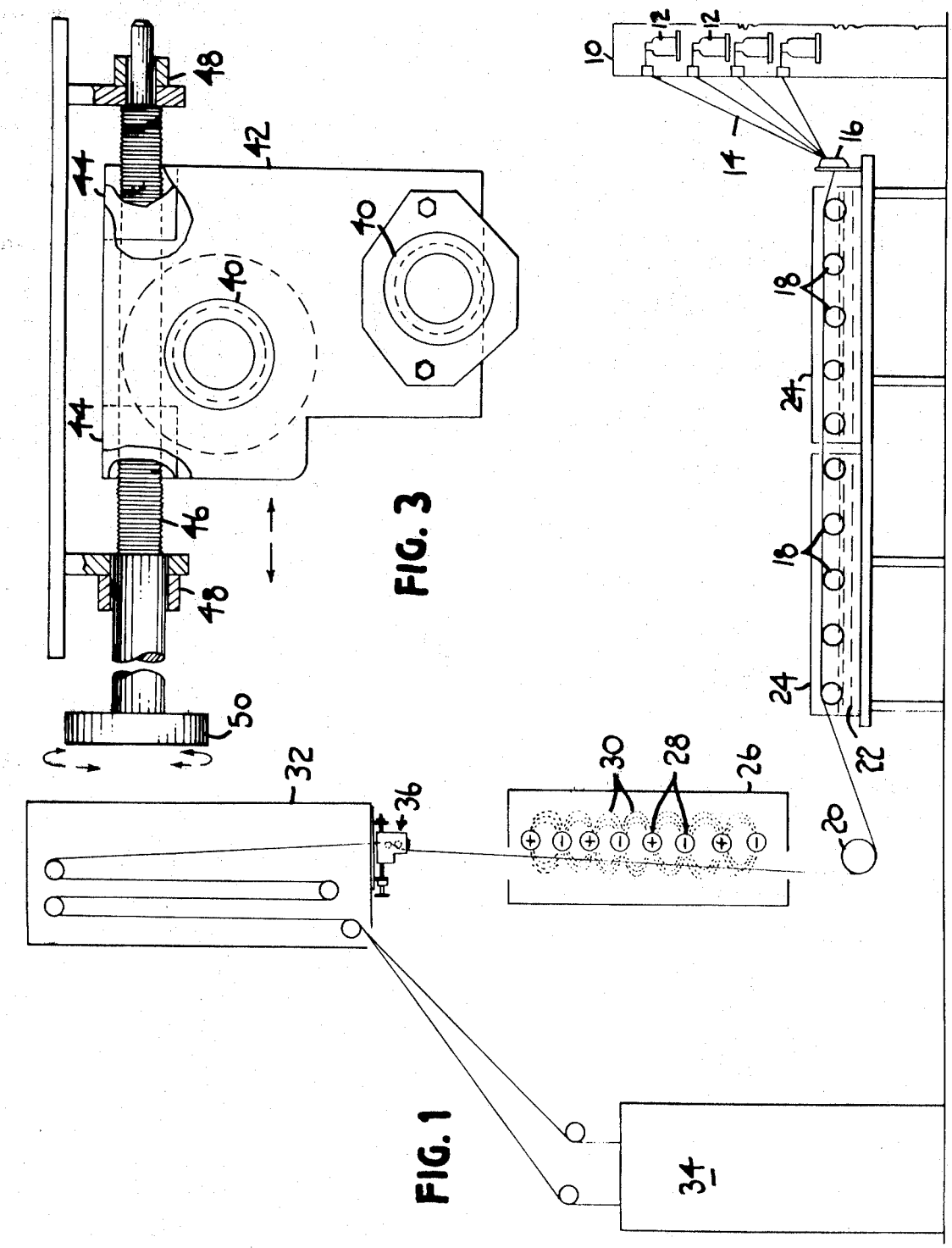

United States Patent

[11] 3,619,538

[72] Inventors John Kallenborn
 Murrysville;
 George B. Zurheide, Upper St. Clair, both of Pa.
[21] Appl. No. 16,070
[22] Filed Mar. 3, 1970
[45] Patented Nov. 9, 1971
[73] Assignee PPG Industries, Inc.
 Pittsburgh, Pa.

[54] PROCESS AND APPARATUS FOR HIGH-FREQUENCY ELECTRICAL DRYING OF FIBROUS STRAND
9 Claims, 3 Drawing Figs.

[52] U.S. Cl................................................. 219/10.61,
 117/93.1 DH, 117/126 GB, 219/10.55
[51] Int. Cl...................................................... H05b 5/00
[50] Field of Search.......................................... 219/10.55,
 10.61; /; 117/93.1, 126; 34/1

[56] References Cited
 UNITED STATES PATENTS
2,303,983 12/1942 Brown............................ 219/10.61
2,503,779 4/1950 Story............................... 219/10.61
2,562,911 8/1951 Hare............................... 219/10.61
2,588,811 3/1952 Dippel et al. .................. 219/10.61
3,437,517 7/1969 Eilerman........................ 219/10.61
2,650,291 8/1953 Kinn............................... 219/10.61
2,865,790 12/1958 Baer............................... 117/93.1
3,364,294 1/1968 Garibian et al. ............... 219/10.61
 FOREIGN PATENTS
 584,070 1/1947 United Kingdom .......... 219/10.61

Primary Examiner—J. V. Truhe
Assistant Examiner—Robert O'Neill
Attorney—Chisholm and Spencer

ABSTRACT: A process and apparatus for drying a liquid adhesive composition on a fibrous substrate. The apparatus comprises a dielectric heater having a grid of spaced, parallel electrodes with a high-frequency electrical field extending therebetween, means for conveying the fibrous substrate through the electrical field in a plane spaced from the plane of the electrodes and means to adjustably position the plane of the substrate and the plane of the electrodes at an angle relative to each other and to dampen vibration of the substrate in a direction perpendicular to the direction of its path of travel.

INVENTORS
JOHN KALLENBORN
GEORGE B. ZURHEIDE

BY Chisholm and Spencer

ATTORNEYS

PROCESS AND APPARATUS FOR HIGH-FREQUENCY ELECTRICAL DRYING OF FIBROUS STRAND

BACKGROUND OF THE INVENTION

In copending application, Ser. No. 605,814, filed Dec. 29, 1966, and assigned to the assignee of the present invention, there is disclosed the use of a novel process employing high-frequency electrical heating, such as dielectric heating, to dry a plurality of coated glass fibrous strands that are wet or saturated with aqueous elastomeric dip. As is set forth more fully in that application, the disclosure of which is incorporated herein by reference, the use of dielectric drying permits subsequent processing of the coated glass fibrous strands over rolls, pulleys and the like without stripping off coating material and/or depositing coating material on supporting and conveying elements. In particular, the above-mentioned application discloses that where it is desired or required to pass the coated glass fibrous strands through a curing oven subsequent to drying, the dielectric drying permits faster production speeds for a given length of curing oven, the use of shorter curing ovens, and better process control than was the case with conventional drying and curing processes that do not utilize dielectric drying. Specifically, it was found that elastomeric adhesive coated strand can be processed at least five to six times faster through the curing oven when exposed first to dielectric drying than was possible when dielectric drying was not used.

While the foregoing disclosure of said copending application represents a significant advancement in processing elastomeric adhesive coated glass fibrous strand, it has now been discovered that improvements are possible in connection with the process and apparatus disclosed therein. Specifically, it has been discovered that when using a grid-type dielectric heater followed by an elongated heating chamber, such as a hot gas curing oven, it is beneficial to provide apparatus intermediate the dielectric heater and the elongated heating chamber to adjustably position the plane of the fibrous strands and the plane of the dielectric heater grid, i.e., electrodes, at an angle relative to each other and to dampen vibration of the fibrous strands in a direction perpendicular to the direction of their path of travel.

Figure 2:
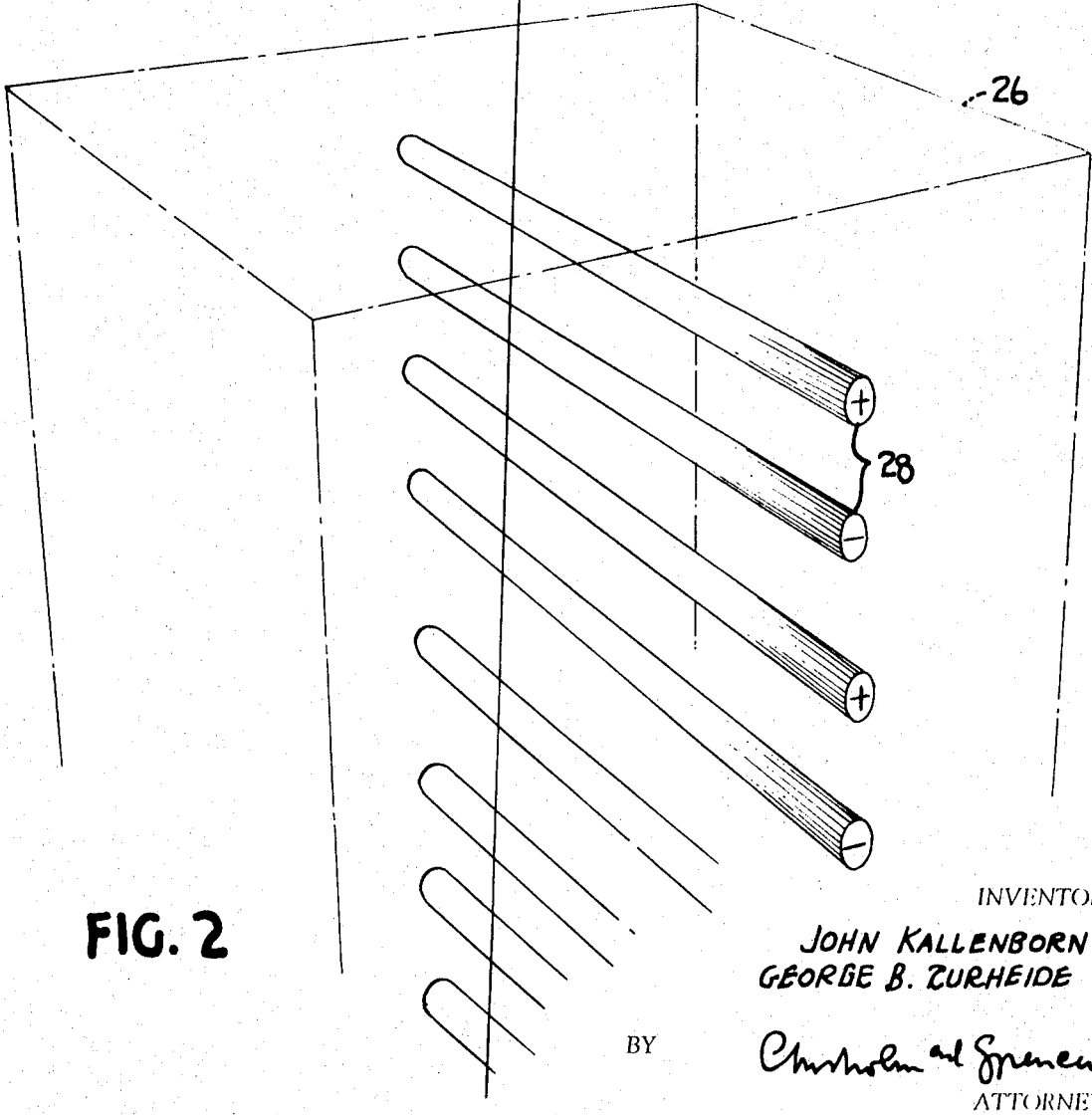

The above and other objects, features and advantages of this invention will become more apparent when considered in conjunction with the accompanying drawings, in which:

FIG. 1 is a diagrammatic representation of a typical process in which the principles of this invention are advantageously employed;

FIG. 2 is a perspective, partly in section, showing the arrangement of the apparatus of this invention in relation to the dielectric heater and curing oven of FIG. 1 when viewed from the right side of the curing oven in relation to strand takeoff occurring at the front of the oven; and FIG. 3 is right elevation, partly in section and partly broken away, of the apparatus of this invention showing details of its structure and its principle of operation.

Referring to FIG. 1, there is shown a creel 10 having mounted thereon a plurality of bobbins 12 containing glass fiber strand 14. Each of the glass fiber strands 14 is coated with a sizing material comprising a lubricant, binder and coupling agent, such as disclosed in U.S. Pat. No. 3,437,517. assigned to the assignee of the present invention. Other suitable size materials that contain suitable coupling agents may be found in U.S. Pat. applications, Ser. No. 599,180, filed Dec. 5, 1966, and Ser. No. 601,341, filed Dec. 13, 1966, now abandoned. Furthermore, as is conventional, each of the glass fiber strands 14 has imparted therein a 0.5 turn per inch twist to provide strand integrity and resistance to fuzzing during initial handling or processing prior to being coated and impregnated with elastomeric material.

The strands 14 are combined in parallel relation and passed through ceramic guides 16 in tangential contact across motor-driven rotating rollers or dip applicators 18 to a motor-driven rotating wiper roller or pulley 20. The rollers or dip applicators 18 are partially suspended in an aqueous elastomeric dip or adhesive 22 contained within vessels or tanks tanks 24. The dip applicators 18 are driven counter to the direction of travel of the strands 14 to improve the coating and impregnation thereof. The pickup of dip 22 by the applicators 18 and strands 14 is more than sufficient to coat and impregnate the strands with the desired final amount of elastomeric adhesive material 22. The wiper roller or pulley 20 is driven counter to the direction of travel of the strands 14 and serves to further impregnate the strands while moving excess dip or adhesive material 22.

From the wiper roller or pulley 20, the coated, impregnated strands are passed vertically through a dielectric heater or drying oven 26. Dielectric heater 26 comprises a vertically arranged series of spaced parallel electrodes 28 electrically connected to a suitable power source (not shown) to produce an alternating high-frequency electrical field 30 between successive oppositely charged electrodes. Since the detailed construction and principle of operation of dielectric heaters does not, per se, form a part of the present invention, reference is made to U.S. Pat. No. 2,503,779 for typical details. For a complete understanding of the present invention, it will be sufficient to point out that as strands 14 coated and impregnated with aqueous elastomeric dip 22 traverse across but not contacting the electrodes 28 and parallel to and through fields 30, the liquid component of the dip, which has a higher dielectric constant than the solid component, is electrically activated to produce a uniform heating action throughout dip material 22. For the purpose of the present invention, the rate and amount of electrical activation or dielectric heating is controlled to the extent of removing or volatilizing substantially all of the liquid component of the aqueous dip material while leaving the solid component substantially unaffected. After leaving dielectric heater 26, the coated strands pass upwardly and then traverse through an elongated hot gas oven 32 or other suitable heating device to cure or react the solid components of the adhesive 22. Following attainment of the desired degree of cure, the adhesive coated fiber glass strands are removed from the curing oven 32 and either collected on a suitable takeup device 34 or passed on for further processing.

In accordance with the present invention, the foregoing objective of removing substantially all of the liquid component of the aqueous dip material 22 can be most efficiently achieved by providing a device or means 36 intermediate the dielectric heater 26 and the elongated heating chamber 32 that permits adjustably positioning the plane of the fibrous strands 14 and the plane of the dielectric heater's electrodes 28 at an angle relative to each other. The invention also teaches utilizing this device 36 to reduce or dampen vibration of the fibrous strands 14, primarily in a direction perpendicular to the direction of their path of travel from the entrance of the dielectric heater 26 to the first strand support 38 in the elongated heating oven 32.

With reference to FIGS. 1-3, the preferred apparatus of this invention broadly encompasses a device 36 for contacting the strands 14 as they exit from the dielectric heater 26 and for adjustably or selectively moving the strands 14 so that the plane of the strands as they traverse the dielectric heater resides at an angle relative to the plane of the electrodes. Also, the preferred apparatus of this invention is constructed and arranged to constrain lateral movement of the strands 14 at an intermediate point along their otherwise unsupported length between the entrance of the dielectric heater 26 and the first strand support 38 in the elongated curing oven 32, thereby reducing or damping the amplitude of vibration in this length that would otherwise be possible. In the vertical arrangement of dielectric heater and elongated curing oven shown, this apparatus or device 36 is conveniently mounted intermediate the dielectric heater and curing oven and, in particular, is preferably mounted on the bottom of the curing oven 32.

With specific reference to FIGS. 2 and 3, the preferred device 36 of this invention comprises a pair of parallel rods 40 extending across and intercepting the strands 14 in their path of travel. Rods 40 may be smooth, as shown, or one or both may have circumferential, spaced grooves therealong to laterally align and space the strands 14 in their path of travel. Rods 40 are vertically spaced with their axes laterally offset from each other so that the strands 14, as they pass between the rods 40, follow a slight angular path causing a very slight tension to be imparted thereto. Rods 40 are mounted on plates 42 located at opposite sides of the curing oven 32. Preferably, either one or both of the rods 40 are journaled for rotation in plates 42 in order to minimize the tension imparted to strands 14 and to minimize the possible removal of adhesive material therefrom. Each plate 42 is provided with a pair of apertured blocks 44 that threadably receive a rod 46, threaded along an intermediate portion of its length. The ends of the rods 46 are each suitably journaled in spaced bearing blocks 48 secured to the bottom of curing oven 32. One end of each rod 46 extends a substantial distance past its bearing block and is provided with a knurled head 50. As will be appreciated, rotation of knurled heads 50 permits selectively or adjustably moving rods 40 toward or away from the plane of electrodes. Consequently, the plane of the strands 14 as they traverse dielectric heater 26 can be adjustably positioned and set at any selected angle relative to the plane of electrodes 28. Also, the constraining action imparted by rods 40 on strands 14 dampens or reduces the amplitude of vibration that would be possible if there were no intermediate support provided for the strands 14 from the bottom of the dielectric heater 26 to the top of the curing oven 32, as shown.

Use of the above-described device has substantially enhanced the process disclosed in application, Ser. No. 605,814. Generally, in connection with that process it has been found desirable to position the strands 14 as they traverse dielectric heater 26 so that they are closer to the electrodes at the exit of the dielectric heater than at the entrance, i.e., they converge toward the plane of the electrodes at an acute angle. By proceeding in this manner, progressively more power is applied to the strands 14 to vaporize the liquid component of the aqueous dip material 22 as the strands traverse through the dielectric heater 26. Moreover, this progressive increase in the power applied is efficiently utilized since, as the coated fibrous substrate dries, its dielectric constant decreases and thus more power is required for maximum drying. In addition, proceeding in the foregoing manner facilitates maintaining the strands 14 as they enter the dielectric heater 26 at a desired distance from the initial electrodes 28 which they traverse. This desired distance is such as to prevent too volatile a boiling off of the liquid constituent causing excessive dip spattering from the strands, arc-out of the dielectric process and related problems. Also, in the process described in application, Ser. No. 605,814, the strands vibrate considerably between the bottom of dielectric heater 26 and the first strand support 38 in the curing oven 32. This vibration is due to lack of support for the strands along this length and also to vibration being imparted to the strands by reason of the rapid reversal of the dielectric fields in the dielectric oven 26. Often this vibration has caused arc-out of the dielectric process because of wet strand coming too close to or touching the dielectric heater's electrodes 28. The device of the present invention, by additionally reducing or damping the amplitude of encountered vibration, has substantially eliminated the occurrence of arc-out directly attributable thereto. It will also be apparent that the device of this invention has further utility, apart from the specific environment mentioned above, in controlling the extent of drying desired, i.e., either more or less, when drying fibers, fabrics, sheet materials and the like in a dielectric heater. In particular, it will be apparent that the device of this invention permits positioning fibers, fabrics, sheet materials and the like so that they are farther away from the electrodes at the exit of the dielectric heater than at the entrance, i.e., they diverge away from the plane of the electrodes at an acute angle.

We claim:

1. In apparatus for heat treating an adhesive composition on a fibrous substrate which includes a dielectric heater having a plurality of adjacent, linearly spaced electrodes with a high-frequency electrical field established between adjacent electrodes, means for conveying said substrate in a substantially linear path of travel through said electrical field, past each electrode, and an elongated heating chamber provided with means to convey said substrate therethrough, the improvement comprising means intermediate said dielectric heater and said elongated heating chamber adjustably positioning the path of travel of said substrate such that the distance between the path of travel and at least one electrode is different than the distance between the path of travel and an adjacent electrode so that the path of travel forms an acute angle with a line extending between the electrodes and wherein said means to adjustably position is constructed and arranged to dampen vibration of said substrate in a direction lateral to the direction of the path of travel.

2. Apparatus according to claim 1 wherein said means intermediate said dielectric heater and said elongated heating chamber also laterally confines said substrate in its path of travel.

3. Apparatus according to claim 2 wherein said means intermediate said dielectric heater and said elongated heating chamber dampens vibration of said substrate in a direction perpendicular to the direction of its path of travel.

4. In apparatus for drying a liquid composition on a substrate which includes a dielectric heater having a plurality of adjacent, linearly spaced electrodes with a high-frequency electrical field established between adjacent electrodes and means for conveying said substrate in a substantially linear path of travel through said electrical field, past each electrode, the improvement comprising means adjustably positioning the path of travel of said substrate such that the distance between the path of travel and at least one electrode is different than the distance between the path of travel and an adjacent electrode so that the path of travel forms an acute angle with a line extending between the electrodes.

5. Apparatus according to claim 4 wherein said substrate and said electrodes converge toward each other in the direction of the path of travel of said substrate.

6. Apparatus according to claim 4 wherein said substrate and said electrodes diverge away from each other in the direction of the path of travel of said substrate.

7. In a method for drying a liquid composition on a substrate which includes providing a dielectric heater having a plurality of adjacent, linearly spaced electrodes with a high-frequency electrical field established between adjacent electrodes and conveying said substrate in a substantially linear path of travel through said electrical field, past each electrode, the improvement comprising positioning the path of travel of said substrate and said linearly spaced electrodes relative to each other such that the distance between the path of travel and at least one electrode is different than the distance between the path of travel and an adjacent electrode so that the path of travel forms an acute angle with a line extending between the electrodes.

8. A method according to claim 7 wherein said substrate and said electrodes converge toward each other in the direction of the path of travel of said substrate.

9. A method according to claim 7 wherein said substrate and said electrodes diverge away from each other in the direction of the path of travel of said substrate.

* * * * *